(12) United States Patent
Thomson

(10) Patent No.: US 6,461,508 B1
(45) Date of Patent: Oct. 8, 2002

(54) APPARATUS FOR SEPARATING DIRT OR DUST FROM AN AIRFLOW

(75) Inventor: Andrew Walter McRae Thomson, Gloucestershire (GB)

(73) Assignee: Notetry Limited, Wiltshire (GB)

( * ) Notice: Subject to any disclaimer, the term of this patent is extended or adjusted under 35 U.S.C. 154(b) by 0 days.

(21) Appl. No.: 09/744,452

(22) PCT Filed: Jul. 16, 1999

(86) PCT No.: PCT/GB99/02313

§ 371 (c)(1),
(2), (4) Date: Jan. 24, 2001

(87) PCT Pub. No.: WO00/04816

PCT Pub. Date: Feb. 3, 2000

(30) Foreign Application Priority Data

Jul. 20, 1998 (GB) .............................................. 9815783

(51) Int. Cl.[7] .............................. A47L 9/16; B01D 45/12
(52) U.S. Cl. ..................... 210/512.1; 209/715; 209/719; 55/447; 55/459.1; 55/462; 55/472; 55/DIG. 3
(58) Field of Search .............................. 210/512.1, 788; 209/715, 719, 725; 55/447, 459.1, 462, 472, DIG. 3

(56) References Cited

U.S. PATENT DOCUMENTS 2,171,248 A * 8/1939 Van Berkel .............. 55/DIG. 3

FOREIGN PATENT DOCUMENTS

| DE | 754339 | * | 10/1951 |
| GB | 2298598 A | * | 9/1996 |
| WO | WO 98/09121 | * | 3/1998 |

* cited by examiner

*Primary Examiner*—David A. Reifsnyder
(74) *Attorney, Agent, or Firm*—Morrison & Foerster LLP

(57) ABSTRACT

The invention provides apparatus for separating dirt or dust from an airflow, comprising a collector (32) having an outer wall (32a) forming an air-rotational surface, an inner wall (34a), an airflow inlet for introducing the airflow substantially tangentially to the outer wall (32a), an airflow outlet for removing air from the collector (32), and at least one fin or baffle (30) positioned within the collector (32), characterized in that the or each fin or baffle (30) is located on the inner wall (34a) of the collector (32) and projects outwardly therefrom. The presence of the fins or baffles (30) on the inner wall (34a) discourages re-entrainment of dirt and dust particles remaining within the separation apparatus after the airflow therethrough has been discontinued.

30 Claims, 4 Drawing Sheets

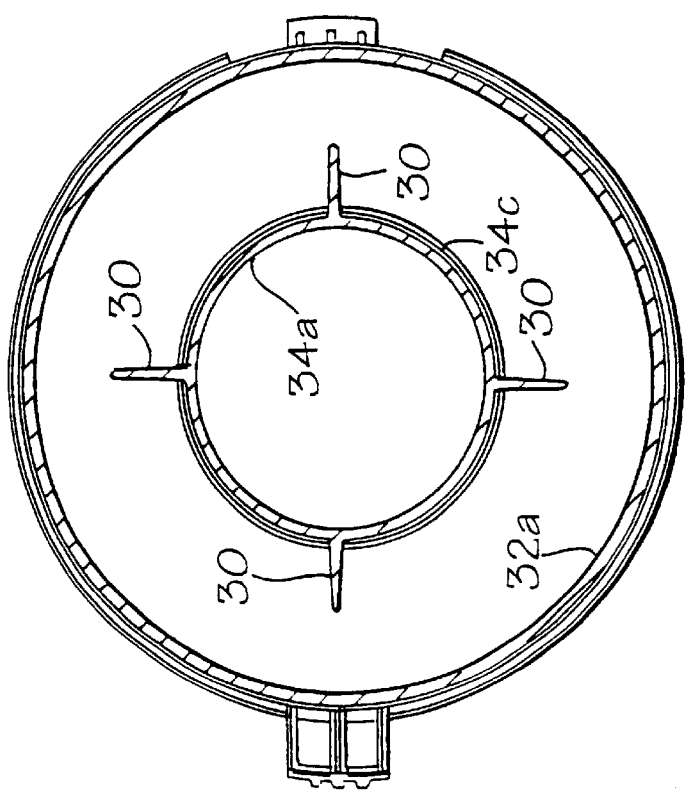
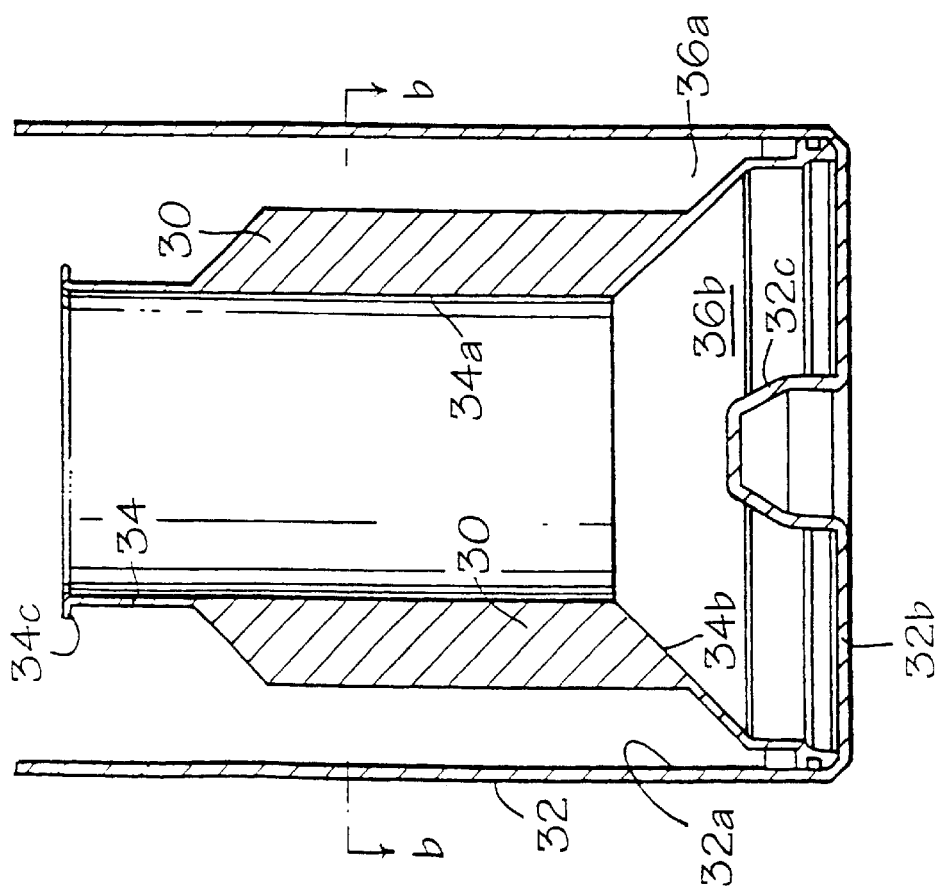
FIG 2b
FIG 2a

FIG 4a
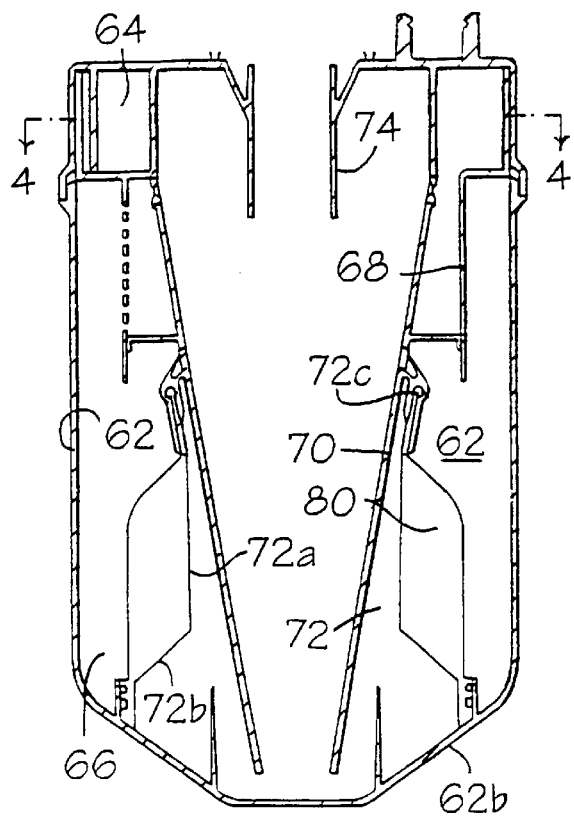
FIG 5a
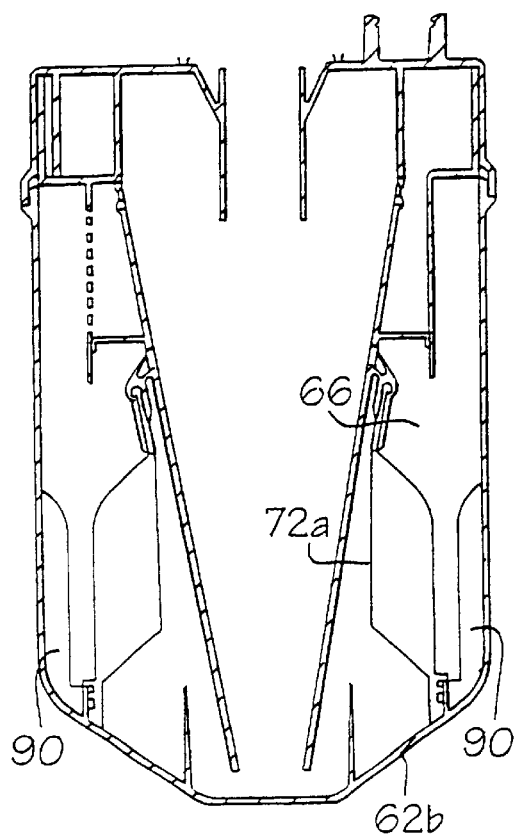
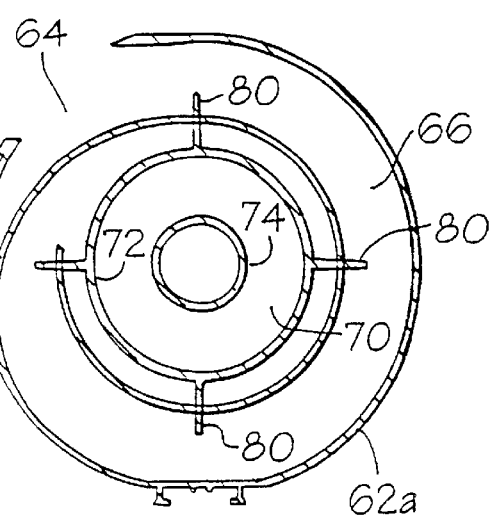
FIG 4b
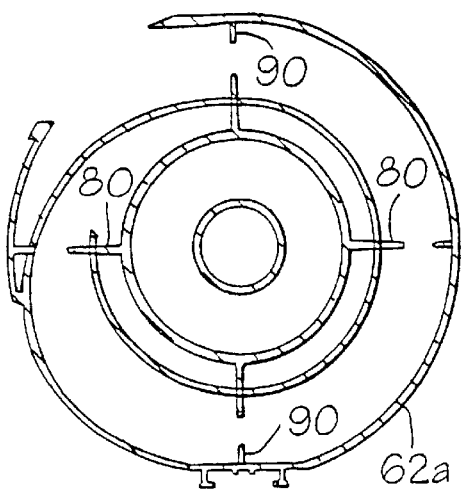
FIG 5b

APPARATUS FOR SEPARATING DIRT OR DUST FROM AN AIRFLOW

The invention relates to apparatus for separating dirt or dust from an airflow particularly, but not exclusively, to such apparatus for use in a vacuum cleaner.

Vacuum cleaners which make use of cyclonic action in order to separate dirt and dust particles from an airflow are known. Essentially, the airflow is introduced to a cylindrical or frusto-conical surface in a tangential manner so that the airflow is caused to move in a spiral or helical motion down the cylindrical or frusto-conical surface. Centrifugal forces force the dirt and dust particles radially outwardly until they come into contact with the stationary wall of the cyclone. The dirt and dust particles are then separated from the airflow and collect in a chamber. It has previously been proposed that fins, baffles or ribs be provided on the outer wall of the chamber or on the surface in order to encourage the dirt and dust separated from the airflow to settle in the container. The fins or baffles also discourage re-entrainment of separated dirt and dust, particularly when the vacuum cleaner is switched on without the collecting chamber first having been emptied. Arrangements of this type are illustrated and described in GB 2 298 598 A, U.S. Pat. No. 2,171,248 and DE 754339.

In all of the prior art arrangements, the fins, baffles or ribs intended to encourage settling of the dirt and dust and to discourage re-entrainment have been located on the outer wall of the separating apparatus. This is a natural location since the majority of the dirt and dust remaining entrained within the airflow or settled in the chamber will be located close to the outer wall. However, the arrangement of the fins or baffles on the outer wall causes some difficulties during the manufacture or assembly of vacuum cleaners of this type, particularly when components are desirably introduced to the interior of the collecting chamber and are of a similar diameter to the chamber. The projection of the fins or baffles inwardly from the outer wall makes it difficult or impossible to achieve the desired construction.

It is an object of the present invention to provide dirt and dust separating apparatus of the type described above but without the constructional disadvantages of existing arrangements. It is a further object of the present invention to provide dirt and dust separating apparatus which is easy and economical to manufacture and which has a separation efficiency equal to or better than existing arrangements. It is a still further object of the present invention to provide dirt and dust separating apparatus in which re-entrainment of dirt and dust previously separated from the airflow is discouraged.

The invention provides a cyclonic separator for separating dirt or dust from an airflow having an outer wall forming an air-rotational surface, an inner wall, a collecting area located between the outer wall and the inner wall for collecting dirt or dust separated from the airflow, an airflow inlet for introducing the airflow substantially tangentially to the outer wall, an airflow outlet for removing air from the separator, the airflow inlet and the airflow outlet being spaced apart from the collecting area, and at least one fin or baffle positioned within the separator, characterised in that the or each fin or baffle is located at least partly in the collecting area on the inner wall of the separator and projects outwardly therefrom.

Further and advantageous features are set out in the subsidiary claims.

It has been found that the removal of the fins or baffles from the outer wall to the inner wall of the collecting area of the cyclonic separator does not reduce the separation efficiency of the separator and furthermore discourages re-entrainment at least as much as the prior art arrangements discussed above. This is surprising because, given the centrifugal forces acting on the dirt and dust particles within the separator, it would be expected that fins or baffles arranged on the outer wall would have a more significant effect. However, moving the fins or baffles to the internal wall then allows a component having a diameter similar to that of the outer wall to be introduced into the container without any difficulty. The fins or baffles can be molded integrally with the inner wall or, alternatively, can be affixed thereto during construction.

Three embodiments of the invention will now be described with reference to the accompanying drawings, wherein:

FIGS. 2a and 2b are vertical and horizontal cross-sections through part of the separating apparatus illustrated in FIG. 1;

FIGS. 4a and 4b are vertical and horizontal cross-sections respectively through the separating apparatus shown in FIG. 4; and FIGS. 5a and 5b are vertical and horizontal cross-sections through an alternative arrangement of separating apparatus suitable for incorporation into a cylindrical cleaner as shown in FIG. 3.

Figure 1A:
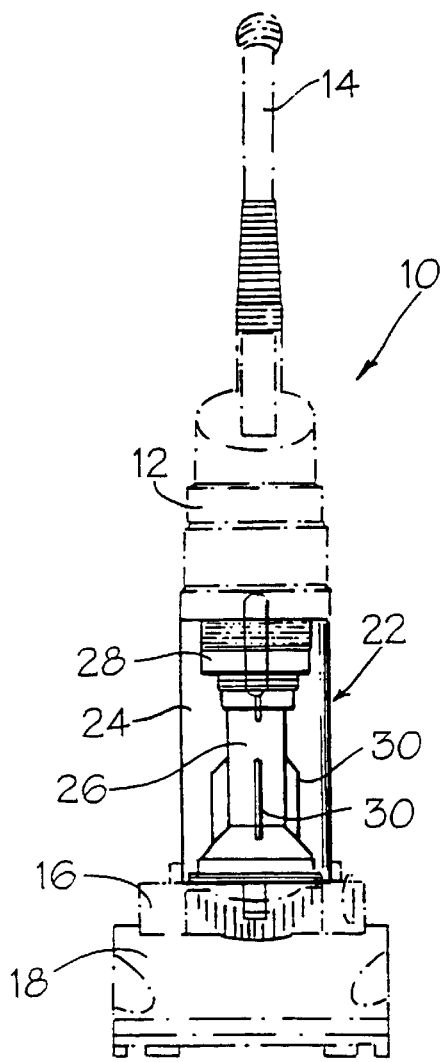
FIGS. 1a and 1b show front and side views respectively of an upright vacuum cleaner incorporating separating apparatus according to the invention.
Figure 1B:
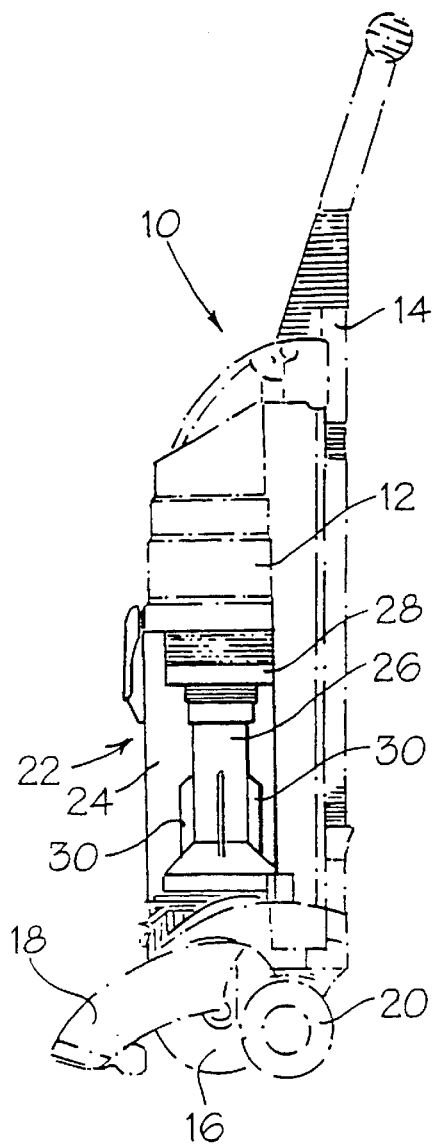

FIGS. 1a and 1b illustrate a cyclonic vacuum cleaner 10 consisting essentially of an upper casing 12, an upstanding handle 14 which is releasable for use in the manner of a wand, a lower motor casing 16 and a cleaner head 18 rotatably mounted on the motor casing 16. Wheels 20 are mounted on the motor casing 16 in order to facilitate movement of the vacuum cleaner 10 across a surface to the cleaned.

The upper casing 12 incorporates dirt and dust separation apparatus 22 and the present invention lies within the dirt and dust separation apparatus. For this reason, the remainder of the cleaner 10 is illustrated in broken lines and the dirt and dust separating apparatus 22 is illustrated in bold lines.

Essentially, the dirt and dust separating apparatus 22 consists of an outer, low efficiency cyclone 24 within which is mounted an inner, high efficiency cyclone 26. Between the outer and inner cyclones 24,26, a shroud 28 is mounted. The shroud 28 forms an outlet from the outer cyclone 24 and leads to an inlet of the inner cyclone 26. In use, air is drawn into the vacuum cleaner 10 via either the cleaner head 18 or the handle 14 when it is released and configured for use as a wand. Appropriate ducting (not shown) conducts the dirty air to a tangential inlet of the outer cyclone 24. The air follows a swirling, helical path around the interior of the outer cyclone 24 thus depositing fluff, debris and large particles in the bottom of the outer cyclone 24. The air then travels upwardly and exits the outer cyclone 24 via the shroud 28. It is then conducted to the interior of the inner cyclone 26 where it is accelerated to very high speeds. Dirt and dust particles remaining entrained within the airflow upstream of the inner cyclone 26 are then separated from the airflow and collected in the bottom of the inner cyclone 26. The air exits the inner cyclone via a vortex finder positioned at the upper end of the inner cyclone 26 and appropriate ducting then leads the clean air to a clean air outlet of the vacuum cleaner.

A vacuum cleaner having the features described above is already known. Indeed, the features of the separating apparatus described thus far are also known. However, the embodiment shown in FIG. 1 also includes fins or baffles 30 located on the exterior wall of the inner cyclone 26 which forms an inner wall of the outer cyclone 24. The fins or baffles 30 form the essential element of the present invention.

The nature and construction of the fins or baffles 30 are illustrated more clearly in FIGS. 2a and 2b. FIG. 2a is a vertical cross-section taken through the lower portion of the separating apparatus 22 and illustrating only the wall of the outer cyclone 24 and the collecting chamber of inner cyclone 26. FIG. 2b is a section taken along the line b—b.

In FIG. 2a, the separating apparatus 22 is delimited by the outer wall 32 of the outer cyclone 24. The outer wall 32 has upstanding cylindrical walls 32a and a circular base 32b. It is molded from a transparent plastics material and engages sealingly and in known manner with the upper part of the main casing 12 illustrated in FIG. 1. A recess 32c is formed in the base 32b of the cylinder 32 which is designed to cooperate with an upstanding projection (not shown) located on the main housing 12 in order to facilitate correct positioning of the separating apparatus 22 after removal from the main casing for emptying purposes.

Situated in the interior of the outer cyclone 24 is a collecting chamber 34 forming part of the inner cyclone 26. The collecting chamber 34 has an upper cylindrical portion 34a and a lower frusto-conical portion 34b which sealingly cooperates with the base 32b of the outer chamber 32. The collecting chamber 34 also forms an inner wall of the outer cyclone 24. A large particle collecting area 36a is defined between the cylindrical wall 32a and the inclined walls of the lower portion 34b of the collecting chamber 34. Fluff, debris and larger dirt particles separated within the outer cyclone 24 will collect in this area. The lower portion 34b of the collecting chamber 34 forms a collecting area 36b of the inner cyclone 26. In use, the upper edge 34c of the collecting chamber 34 will sealingly engage with a frusto-conical cone portion (not shown) forming part of the inner cyclone 26.

The fins or baffles 30 are located on the outside of the cylindrical portion 34a of the collecting chamber 34 and extend downwardly to meet the inclined walls of the lower portion 34b. As can be seen from FIG. 2b, four equispaced fins or baffles 30 are provided. Each fin or baffle 30 extends radially outwardly from the cylindrical portion 34a towards the cylindrical wall 32a. In the preferred embodiment, each fin or baffle 30 projects outwardly from the cylindrical portion 34a by a distance of between 20 and 25 mm, preferably 21.6 mm. The distance between the cylindrical portion 34a and the cylindrical wall 32a is between 38 and 40 mm, preferably 38.15 mm. The upper edge of each fin or baffle 30 is inclined downwardly at an angle with respect to the longitudinal axis of the inner cyclone 26. In the preferred embodiment, the inclination of the upper edge of each fin or baffle 30 to the longitudinal axis is 45°. The inclination could however be varied but is preferably between 30° and 60°.

It has been found experimentally that the provision of the fins or baffles 30 on the inner wall formed by the cylindrical portion 34a of the inner cyclone collecting chamber 34 does not detract from the separation efficiency of the separating apparatus 22 as a whole and, furthermore, discourages to a significant extent any possible re-entrainment of dirt and dust particles collected within the collecting area 36a, particularly when the vacuum cleaner 10 is switched on without the collecting area 36a first being emptied.

Figure 3B:
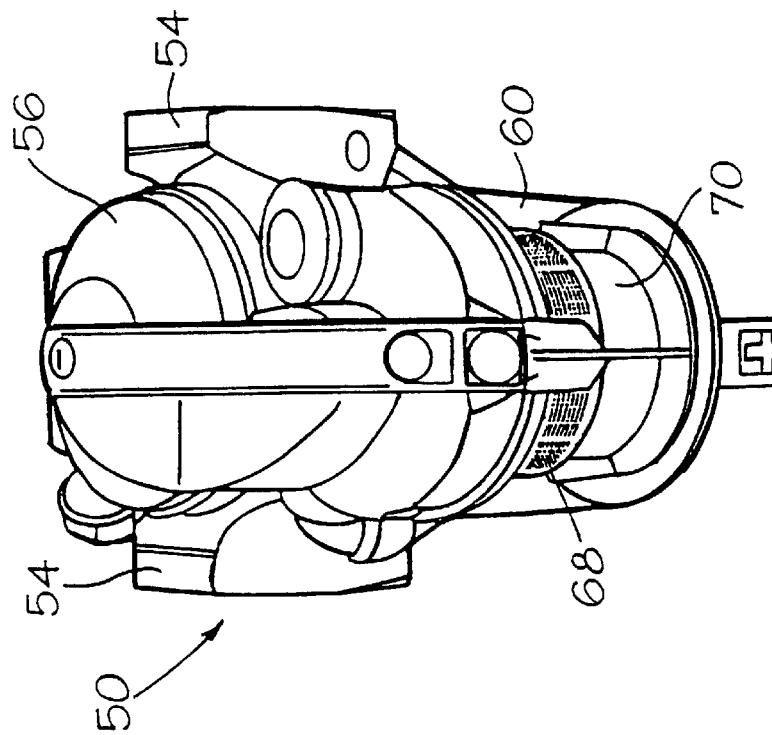
FIGS. 3a and 3b are side and top views respectively of a cylinder vacuum cleaner incorporating separating apparatus according to the present invention.
Figure 3A:
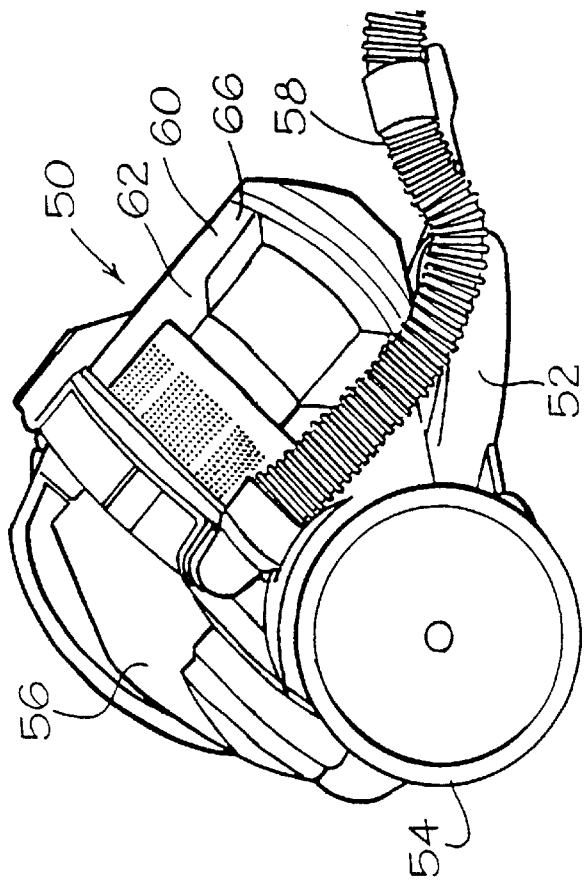

The invention is equally applicable to cylinder cleaners and a cylinder cleaner incorporating the invention is illustrated in FIGS. 3a and 3b. Essentially, the vacuum cleaner 50 comprises a chassis 52 having wheels 54 mounted thereon, a motor casing 56 housing a motor, a hose 58 to which an appropriate floor tool can be attached for the introduction of dirty air to the cleaner, and dirt and dust separating apparatus 60. As is conventional, dirty air is introduced to the separating apparatus 60 by way of the hose 58 under the influence of suction created by a fan driven by the motor.

Essentially, the separating apparatus 60 has exactly the same elements as those shown and described in FIGS. 1 and 2. However, in this case, the overall dimensions of the apparatus 60 are different from those illustrated in the previous Figures, and the inner cyclone also has a frusto-conical lower portion. However, these differences do not effect the operation of the separation apparatus 60 in any way. As before, air enters the outer cyclone 62 via a tangential inlet 64 and spirals around outer wall so as to deposit fluff, debris and large dirt particles in a first dirt collecting area 66. The air then exits the outer cyclone 62 via the shroud 68 and passes to the interior of the inner cyclone 70 where it is accelerated so that fine dust and dirt is separated from the airflow and collected in the collecting chamber 72. Clean air exits through a vortex finder 74 at the top of the inner cyclone 70 and is conducted out of the machine by appropriate ducting.

Vertical and horizontal cross-sections through the dirt and dust separating apparatus 60 are shown in FIGS. 4a and 4b respectively. The horizontal cross-section is taken along the line IV—IV. The cylindrical outer wall 62a is connected to a frusto-conical lower wall 62b. Again, the cylindrical wall 62a and lower wall 62b are manufactured from a transparent plastics material. The collecting chamber 72 of the inner cyclone has a cylindrical portion 72a and a frusto-conical portion 72b which extends to and sealingly abuts against the frusto-conical base portion 62b. As before, the upper lip 72c of the cylindrical portion 72a is arranged to sealingly engage with the frusto-conical cyclone 70 which is capable of separating the fine dirt and dust particles from the airflow.

Four radial baffles 80 are equispaced about the outer surface of the cylindrical portion 72a of the collecting chamber 72. As before, the fins or baffles 80 extend downwardly to meet the frusto-conical portion 62b. The fins or baffles 80 extend outwardly from the cylindrical portion 72a by a distance of around 21.5 mm and the distance between the cylindrical portion 72a and the outer wall 62a is around 38–40 mm. The upper edge of each fin or baffle 80 is inclined to the longitudinal axis of the inner cyclone 70 by about 50°.

As before the fins or baffles 80 act so as to discourage re-entrainment of dirt and dust particles collected within the outer cyclone 66 and remaining within the outer cyclone 66 after the vacuum cleaner has been switched off.

A third embodiment of the invention is illustrated in FIGS. 5a and 5b. These Figures correspond closely to FIGS. 4a and 4b and illustrate the fact that additional fins or baffles 90 can also be mounted on the outer wall 62a radially outwardly of the original fins or baffles 80. A gap is therefore created between opposing fins or baffles 80,90 at locations spaced around the outer cyclone 66. The effect of this is to increase still further the prevention of re-entrainment of dirt and dust particles into the airflow after the vacuum cleaner has been switched off.

In the preferred embodiment illustrated in FIG. 5, the additional baffles 90 are mounted on the cylindrical outer wall 62a and extend upwardly as far as the upper edge of the fins or baffles 80 mounted on the inner wall 72a. The upper edge of each additional fin or baffle 90 is also inclined to the longitudinal axis of the inner cyclone 70 at the same angle as the upper surface of the fins or baffles 80, but in the opposite direction. The additional fins or baffles 90 extend downwardly to meet the frusto-conical base portion 62b. The gap left between the fins or baffles 80 and the additional fins or baffles 90 is between 5 and 10 mm, preferably 8.6 mm. The additional fins or baffles 90 project into the outer cyclone 66 to a distance of about 8.48 mm.

A variety of modifications and variations will be apparent to a skilled reader. Those variations and modifications are intended to be included within the scope of the invention.

What is claimed is:

1. A cyclonic separator for separating dirt or dust from an airflow, comprising:
   an outer wall, an inner wall, a collecting area located between the outer wall and the inner wall for collecting dirt or dust separated from the airflow, an airflow inlet for introducing the airflow substantially tangentially to the outer wall, an airflow outlet for removing air from the separator, the airflow inlet and the airflow outlet being spaced apart from the collecting area, and at least one first fin or baffle positioned within the separator,
   wherein each first fin or baffle is located at least partly in the collecting area on the inner wall and projects outwardly from the inner wall.

2. A cyclonic separator as claimed in claim 1, comprising a plurality of first fins or baffles.

3. A cyclonic separator as claimed in claim 2, comprising between two and six first fins or baffles.

4. A cyclonic separator as claimed in claim 3, comprising four first fins or baffles.

5. A cyclonic separator as claimed in claim 1, 2, 3 or 4, wherein each first fin or baffle extends radially outwardly from the inner wall.

6. A cyclonic separator as claimed in claim 5, wherein each fin or baffle has an upper edge which is inclined to a longitudinal axis of the separator.

7. A cyclonic separator as claimed in claim 5, wherein each fin or baffle extends between one quarter and three quarters of a distance between the inner wall and the outer wall.

8. A cyclonic separator as claimed in claim 5, wherein the outer wall is substantially cylindrical.

9. A cyclonic separator as claimed in claim 5, wherein the inner wall is substantially cylindrical.

10. A cyclonic separator as claimed in claim 1, 2, 3 or 4, wherein each first fin or baffle has an upper edge which is inclined to a longitudinal axis of the separator.

11. A cyclonic separator as claimed in claim 10, wherein the angle of inclination of the upper edge to the longitudinal axis is between 30° and 60°.

12. A cyclonic separator as claimed in claim 11, wherein the angle of inclination of the upper edge to the longitudinal axis is between 45° and 50°.

13. A cyclonic separator as claimed in claim 10, wherein each fin or baffle extends between one quarter and three quarters of a distance between the inner wall and the outer wall.

14. A cyclonic separator as claimed in claim 10, wherein the outer wall is substantially cylindrical.

15. A cyclonic separator as claimed in claim 10, wherein the inner wall is substantially cylindrical.

16. A cyclonic separator as claimed in claim 1, 2, 3 or 4, wherein each first fin or baffle extends one quarter and three quarters of a distance between the inner wall and the outer wall.

17. A cyclonic separator as claimed in claim 16, wherein each first fin or baffle extends substantially half of the distance between the inner wall and the outer wall.

18. A cyclonic separator as claimed in claim 16, wherein the outer wall is substantially cylindrical.

19. A cyclonic separator as claimed in claim 16, wherein the inner wall is substantially cylindrical.

20. A cyclonic separator as claimed in claim 1, wherein the outer wall is substantially cylindrical.

21. A cyclonic separator as claimed in claim 1, wherein the inner wall is substantially cylindrical.

22. A cyclonic separator as claimed in claim 21, further comprising a second cyclonic separator, of which the inner wall forms a part.

23. A cyclonic separator as claimed in claim 22, wherein the second cyclonic separator has a higher efficiency of separation than the first cyclonic separator.

24. A cyclonic separator as claimed in claim 23, wherein the second cyclonic separator is located substantially wholly within the first cyclonic separator.

25. A cyclonic separator as claimed in claim 22, wherein the second cyclonic separator is located substantially wholly within the first cyclonic separator.

26. A cyclonic separator as claimed in claim 1, further comprising additional fins or baffles provided on the outer wall radially outwardly of the first fins or baffles.

27. A cyclonic separator as claimed in claim 26, wherein the additional fins or baffles have substantially the same shape as the first fins or baffles.

28. A cyclonic separator as claimed in claim 26, wherein the distance between pairs of the first and additional fins or baffles is between one eighth and one half of the distance between the inner and outer walls.

29. A cyclonic separator as claimed in claim 28, wherein the distance between pairs of the first and additional fins or baffles is substantially one quarter of the distance between the inner and outer walls.

30. A cyclonic separator as claimed in claim 1, wherein the outer wall forms an air-rotational surface.

* * * * *